US011895745B2

(12) United States Patent
Lula et al.

(10) Patent No.: US 11,895,745 B2
(45) Date of Patent: Feb. 6, 2024

(54) REMOTE POWER DELIVERY FOR DISTRIBUTED LIGHTING WITH INTEGRATED DATA TRANSMISSION

(71) Applicant: Viza Electronics Pte. Ltd., Charlotte, NC (US)

(72) Inventors: Jack Lula, Burlington (CA); Robert Zamora, Huntersville, NC (US)

(73) Assignee: Viza Electronics Pte. Ltd., Charlotte, NC (US)

( * ) Notice: Subject to any disclaimer, the term of this patent is extended or adjusted under 35 U.S.C. 154(b) by 320 days.

(21) Appl. No.: 17/110,059

(22) Filed: Dec. 2, 2020

(65) Prior Publication Data

US 2021/0168913 A1 Jun. 3, 2021

Related U.S. Application Data

(60) Provisional application No. 62/942,692, filed on Dec. 2, 2019.

(51) Int. Cl.
*H05B 45/14* (2020.01)
*H05B 47/19* (2020.01)
*H05B 45/40* (2020.01)

(52) U.S. Cl.
CPC ............. *H05B 45/14* (2020.01); *H05B 45/40* (2020.01); *H05B 47/19* (2020.01)

(58) Field of Classification Search
None
See application file for complete search history.

(56) References Cited

U.S. PATENT DOCUMENTS 5,630,836 A * 5/1997 Prem .................. A61N 1/37211 607/66
2003/0100837 A1* 5/2003 Lys ........................... F21K 9/64 600/476
2005/0069321 A1* 3/2005 Sullivan ................... H04B 3/56 398/116
2005/0232442 A1* 10/2005 Seknicka ................. H04R 3/00 381/92
2013/0214699 A1* 8/2013 Jonsson .................. F21V 23/04 315/297

* cited by examiner

*Primary Examiner* — Crystal L Hammond
(74) *Attorney, Agent, or Firm* — Lee & Hayes, P.C.

(57) ABSTRACT

A power supply may provide a constant source of DC power through a first inductor-capacitor network, across a two-line conductor, and through a second inductor-capacitor network to a remote load. A modulator at the supply may modulate a carrier frequency with an information signal containing control data and may pass a modulated signal to the load via the conductor with the DC power. At the load, a demodulator may extract the control data, and operation of the load, such as a bank of LEDs subjected to dimming, may be modified based on the control data. The inductor-capacitor networks enable decoupling of the DC power and data for simple and low-cost implementations at comparatively low frequencies. In examples, the carrier frequency is at least 10 times the rate of the information signal yet below typical communication frequencies such as 525 KHz.

20 Claims, 8 Drawing Sheets

REMOTE POWER DELIVERY FOR DISTRIBUTED LIGHTING WITH INTEGRATED DATA TRANSMISSION

CROSS-REFERENCE TO RELATED APPLICATION

This application claims the benefit of priority to U.S. Provisional Application No. 62/942,692, entitled "Remote Power Delivery for Distributed Lighting with Integrated Data Transmission," filed Dec. 2, 2019, which is expressly incorporated herein by reference in its entirety.

BACKGROUND

In various situations, it may be desirable to locate devices with low-power electrical loads remotely from their power source. Placed remotely such as in an outdoor environment, the devices could be made to be more resilient, lower in cost, smaller in size, and more flexible in usage. Simultaneously, a DC power supply driving the devices via electrical cabling may be located in a protected location. The protected environment may ensure safety for the power supply and make maintenance or repair of the power supply convenient. Although examples for this arrangement are plenty, one is the use of light emitting diodes (LEDs) as distributed lighting to illuminate an area.

LEDs are semiconductor-based radiative elements that provide efficient options for distributed lighting. LEDs are often arranged in groups or banks with the radiative element or load being called the LED head. They are typically driven by DC power from a power source, which may be located with the LED head but also could be positioned at a remote location.

In many situations involving LEDs for area illumination, it is beneficial or required to locate the LED head remotely from the power unit. These situations may include installations where repair and replacement of the light fixture may be difficult, such as undercabinet lighting and outdoor architectural lighting. Reasons for separating the power units from the LED heads include consolidation of power and control at the same location, reliability and ease of repair in a reachable location possibly with lower environmental requirements, system cost, or packaging. Another reason for separation may be to provide a more flexible installation where multiple small lighting endpoints are driven from a single power box.

Challenges can arise for communicating between power sources and remotely located loads such as LEDs. In a given installation, the LED heads may have different configurations and capabilities that can impact the source power. Specific market requirements may even require individual addressing of LED loads. Communications from the power unit may include group or individual dimming levels for the LEDs, white or color operating points for the LEDs, and instructions on how to respond to locally connected sensors. These requirements mean that at least a one-way communication as a form of control from the power unit to the lighting heads is needed. Furthermore, this method allows for wired communications which in some cases provides added reliability over wireless-type implementations.

Moreover, transmissions from the lighting heads to the power unit may be needed. The lighting heads may be close to or incorporate other features such as sensors or actuators. The feedback from these accessories may be useful for centralized control of a remote lighting solution. Other feedback useful for an installation may include maximum power draw to allow the central unit to dim all units to avoid overload, communication of supported functions such as ability to support white point control, minimum input voltage to allow the central unit to optimize its operating point, etc. Therefore, two-way communication between the power unit and the lighting heads may also be needed.

While sophisticated electronic options may satisfy these needs, the lighting industry is extremely cost driven. All features must be supplied at a low cost for each unit and for the system, while maintaining a solution that provides user protections such as low voltage and fast disconnect response times, among many others.

BRIEF DESCRIPTION OF THE DRAWINGS

The detailed description is described with reference to the accompanying figures. The same reference numbers in different figures indicate similar or identical items.

DESCRIPTION

Figure 1:
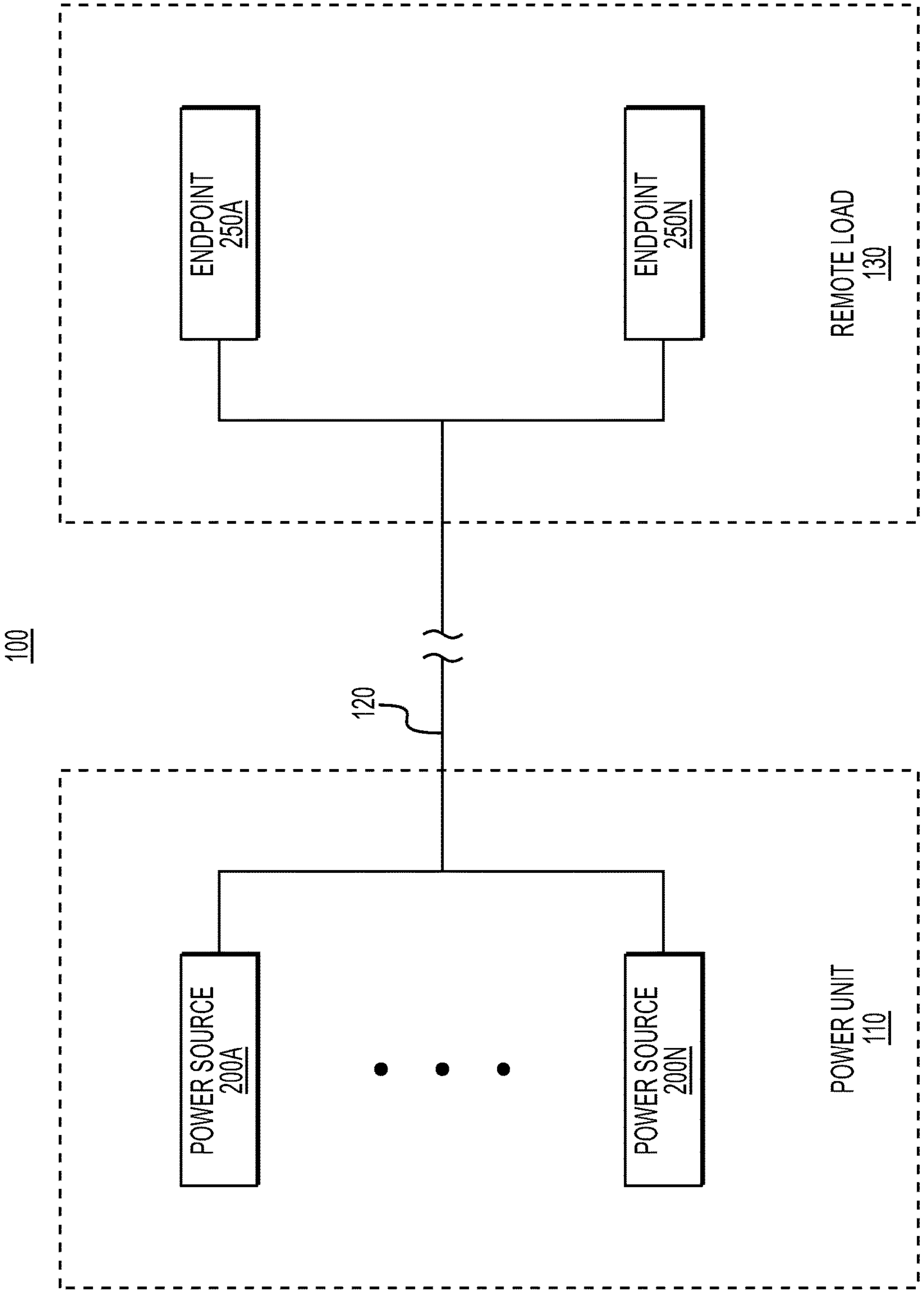
FIG. 1 is a general block diagram of a system for remote power delivery with integrated data transmission consistent with examples of the disclosure.

The following detailed description is generally directed to technologies for integrating data communication with power and delivering both at least from a power source to a remote electrical load. Among various implementations, the remote electrical load may be LED heads or endpoints positioned apart from power supplies that drive them.

To effectuate communication from a power supply to an affiliated LED endpoint, a power source includes a modulator that modulates control data onto a carrier frequency and transmits the modulated signal to the remote endpoint along with power. At the endpoint, the modulated signal is demodulated to extract the control data while the power is provided to drive the LED. In response to the received control data, the endpoint may affect operation of the LED. A selection of inductors and capacitors forms two filter types in the system. A low-pass filter for the power supply and the load enables the power to pass between them, and a high-pass filter for the modulator and demodulator enables the integrated data communication to pass between them. A similar arrangement may provide bidirectional communication from the endpoint back to the power source. Technical benefits other than those specifically identified herein can also be realized through an implementation of the disclosed technologies.

Utilizing the technologies described herein, various embodiments and examples in this disclosure may include a system having a source for delivering power integrated with control data, a conductor communicating the power and a first modulation signal from the source, and an endpoint positioned remotely from the source for receiving the power and the first modulation signal. In some implementations, the technologies described herein may be applied only to a source for delivering power integrated with control data or only to an endpoint for receiving power integrated with control data.

In various embodiments of the present disclosure, the source may include a power supply with a source low-pass filter coupled to a supply output and configured to provide power to the supply output. In some examples, the power supply may be an AC-DC converter configured to convert mains AC power to DC power. The source low-pass filter may be a supply capacitor in parallel with the power supply and a supply inductor in series between the power supply and the supply output. The supply capacitor and supply inductor may be selected with values to provide a low-pass filter sufficient to pass the power to a supply output while preventing higher frequencies from interfering with the power supply.

As also exemplified in the disclosure, a source microcontroller or similar digital decoding or control device may receive an external input relating to control data for an electrical load and provide a first information signal that includes the control data at a data frequency. The external input may indicate through the control data, for example, a dimming value for an LED at a remote load. Programming within the source microcontroller provides a conversion of the received control data into the first information signal.

In another example, the system and specifically the source for delivering power integrated with control data may include a source modulator coupled to the source microcontroller. The source modulator may have circuitry configured to generate a first modulation signal. In some options, the modulation circuitry is an AND gate with a first input coupled to receive the first information signal and a second input coupled to an oscillator to receive a first carrier frequency. In certain examples, the first carrier frequency is greater than the data frequency, preferably by a multiple or more. in some embodiments, the first carrier frequency may be at least 10 times the data frequency to help minimize system noise. For instance, the first carrier frequency may be greater than 20 KHz. As well, the first carrier frequency may be chosen to avoid the AM range and, for instance, could be less than 525 KHz.

The source modulator may be further configured to pass the first modulation signal through a source high-pass filter to the supply output. In some examples, the high-pass filter may be an injection capacitor in series between the modulator and the supply output. The value of the injection capacitor may be selected to permit the passage of the first modulation signal from the source modulator onto the supply output while preventing interference from lower frequency signals at the supply output.

In further examples as disclosed herein, a conductor may be connected to the supply output to communicate the power to an endpoint remotely located from the source. The conductor may be part of a two-wire cable suitable for conveying both the power and the first modulation signal across a distance between the source and the endpoint.

In additional examples, the system may further include the endpoint positioned remotely from the source for receiving the power and the first modulation signal. The endpoint may include an endpoint input coupled to the conductor to receive the power, a load with an endpoint low-pass filter coupled to the endpoint input, an endpoint demodulator, and an endpoint microcontroller. In some examples, the low-pass filter may be a load capacitor in parallel with the load and a load inductor in series between the endpoint input and the load. Values for the load inductor and the load capacitor may be chosen so that the low-pass filter sufficiently blocks high-frequency signals on the conductor at the endpoint input while passing the power to the load.

Further, the endpoint demodulator may include an endpoint high-pass filter coupled to the endpoint input and include demodulation circuitry. The high-pass filter may be a demodulator capacitor positioned in series with the endpoint input and the endpoint demodulator with a capacitance value selected to permit passage of the first modulation signal but to prevent interference by lower frequency voltages at the endpoint input. The demodulation circuitry of the endpoint demodulator may be configured to demodulate the first modulation signal received with the power at the endpoint input.

In yet further examples, the endpoint may include a microcontroller or similar electronics configured to receive the control data from the endpoint demodulator and to provide signals for controlling operation of the load based at least in part on the control data. For instance, the control data may specify a particular dimming level for an LED as the load. The endpoint microcontroller may process the control data to effectuate a change in dimming level for an LED arranged as the load in the system.

In some implementations, the system for delivering and receiving power integrated with control data may include circuitry to permit transmission of data from the endpoint to the source. Specifically, the endpoint microcontroller may be arranged to receive feedback data local to the load. The feedback data may include, for instance, a desired white point control setting for an LED acting as the load or any other response from a sensor relative to the operation of the LED.

The endpoint may additionally include an endpoint modulator coupled to the endpoint microcontroller and having modulation circuitry. The modulation circuitry may generate a second modulation signal comprising a second carrier frequency modulated with a second information signal that includes the feedback data. In some arrangements, the modulation circuitry of the endpoint modulator may be an AND gate with a first input receiving the second information signal from the endpoint microcontroller and a second input receiving the second carrier frequency from an oscillator. In certain implementations, the second carrier frequency is the same as the first carrier frequency to create a half-duplex communication system. Potential contention between the first modulated signal and the second modulated signal may be managed, for example, by time slots or similar coordination. In other options, the second carrier frequency is different from the first carrier signal to create a full-duplex communication system. The endpoint modulator provides the second modulation signal to the endpoint input for transmission along the conductor to the source.

In other examples, the source may further include a source demodulator coupled between the supply output and the source microcontroller. The source demodulator may receive the second modulation signal at the supply output that was transmitted by the endpoint modulator. The source demodulator may include circuitry to demodulate the second information signal from the second carrier frequency and to provide the second information signal to the source microcontroller. As a result, the feedback data generated at the endpoint may be transmitted back to the source and may be processed by the source microcontroller to further control operation of the load.

In other variations, the system as disclosed may include additional sources connected in parallel with the source. The additional sources may each have an additional power supply and an additional source modulator to provide redundancy for the source.

As well, in other embodiments, the system may include additional endpoints connected in parallel to the endpoint. The additional endpoints may each have an additional load and an additional endpoint demodulator. Each additional endpoint may be addressed separately by the source through the modulated signal to communicate control data specific to the specific load within the additional endpoint.

As a combination of reliability and cost, examples of the system can decrease use of electronic components on the load. This decrease can help make the whole system more reliable and less susceptible to electrical transients, temperature changes, and many of the other potential disturbances outdoor items are exposed to. The coupling and decoupling into the power line and extracting of the transmitted data may connect remote LED endpoints while eliminating the downsides of the main power system being in close proximity. As well, the arrangement can maintain features such as dimming, which would traditionally not be feasible over long remote applications such as using phase-cut dimming or other power control techniques.

As described in the context of the figures, the disclosed system takes advantage of the remote heads not having large instantaneous load changes as seen by the central power unit. This is accomplished either with bulk capacitance limiting the load change as seen by the central power unit and/or limiting the speed of load changes via hardware or firmware. As the instantaneous load changes are slow, the required bandwidth of the delivered power can also be low. This allows the power cable to be decoupled from the central power source and the endpoints via low-cost inductors, and for digital data to be injected onto the power cable using low-cost capacitors and capacitive coupling as long as the modulation frequency is sufficiently higher than the required bandwidth of the power delivery.

By reducing the bandwidth required for power delivery, low-cost circuitry can be used for signal injection and detection on the power delivery cable. As the digital data is modulated and demodulated, significant noise rejection over simple voltage level signaling is achieved. Alternate systems that pulse-width modulate the power delivery to accomplish dimming require large power bandwidths to enable dimming to low levels, especially with modern flicker requirements. These large switching transients can generate significant electromagnetic interference (EMI) limiting cable length and/or requiring more expensive cabling schemes to ensure EMI compliance.

While this disclosure refers to LED endpoints, substantially the same implementation could be used for any low-power endpoint, such as area sensors. In these other implementations as well, the total cost of the solution or the implementation of the solution would benefit from having the primary unit powering one or multiple endpoints in a different and remote location from the power source according to the examples of this disclosure.

While the embodiments disclosed herein are presented primarily in the context of delivering DC power integrated with data from a power source to one or more LED heads located remotely, the technologies disclosed herein can be utilized to deliver DC power and other types of data configurations to endpoints other than LEDs. Additional details regarding the configuration and operation of the various components and processes described briefly above will be presented below with regard to FIGS. 1-7.

In the following detailed description, references are made to the accompanying drawings that form a part hereof, and that show, by way of illustration, specific embodiments or examples. The drawings herein are not drawn to scale. Like numerals represent like elements throughout the several figures (which might be referred to herein as a "FIG." or "FIGS.").

As generally described herein, FIG. 1 is a general block diagram of a system for remote power delivery with integrated data transmission. The block diagram of FIG. 1 illustrates at a high level the overall layout and context for a power-delivery system 100 described in more detail in various embodiments that follow.

As illustrated in FIG. 1, a system 100 for remote power delivery with integrated data transmission may generally include a power unit 110 providing electrical power by way of a conductor 120 to an electrical load 130 positioned at a remote location. Power unit 110 includes a power source 200, although in at least one implementation as shown in FIG. 1, power unit 110 may have a plurality of power sources such as power source 200A to power source 200N. Power sources 200A-200N may be connected in parallel to provide known advantages for the distribution of electrical power as needed, as well as to provide redundancy in case a single power source 200 becomes inoperable.

In techniques described in further detail in this disclosure, generic power source 200 may deliver low-voltage DC power for use by electrical load 130. As well, power source 200 generates a modulated information signal for communicating data to remote load 130 together with the delivered power.

Conductor 120 may be a standard two-wire cable readily known in the industry for distributing low voltage power to a load. Alternatives for the cable to include additional conductors, whether for delivering power or separately providing other data communications, are possible and would not detract from the principles of the present disclosure.

Remote load 130 receives electrical power delivered from power unit 110 via conductor 120 and may include any type of low-power electrical load commonly positioned remotely from its power source. In the present disclosure, remote load 130 is generally one or more banks of LEDs configured for distributed lighting to illuminate an area, such as overhead lighting in a room or security lighting outside a building. Other examples would be well understood, including various ambient sensors, cameras, small motors, and similar devices.

Remote load 130 includes an electrical load or endpoint 250, although in at least one implementation as shown in FIG. 1, remote load 130 may have a plurality of electrical loads 250 such as endpoint 250A to endpoint 250N. Endpoint 250 receives low-voltage power from conductor 120 as provided by power source 200 and uses that power for its operation. In addition, endpoint 250 includes electronics sufficient to receive and demodulate the information signal provided by power source 200. Endpoint 250 may then process control data within the information signal to affect operation of its device, e.g. a bank of LEDs.

In particular implementations addressed further below, system 100 may also include functionality for endpoint 250 to communicate feedback to power source 200. For example, sensors in the vicinity of endpoint 250 may collect information about the operation of the electrical load, and endpoint 250 may send a separate modulated signal across conductor 120 to be received and processed by power source 200.

Figure 2A:
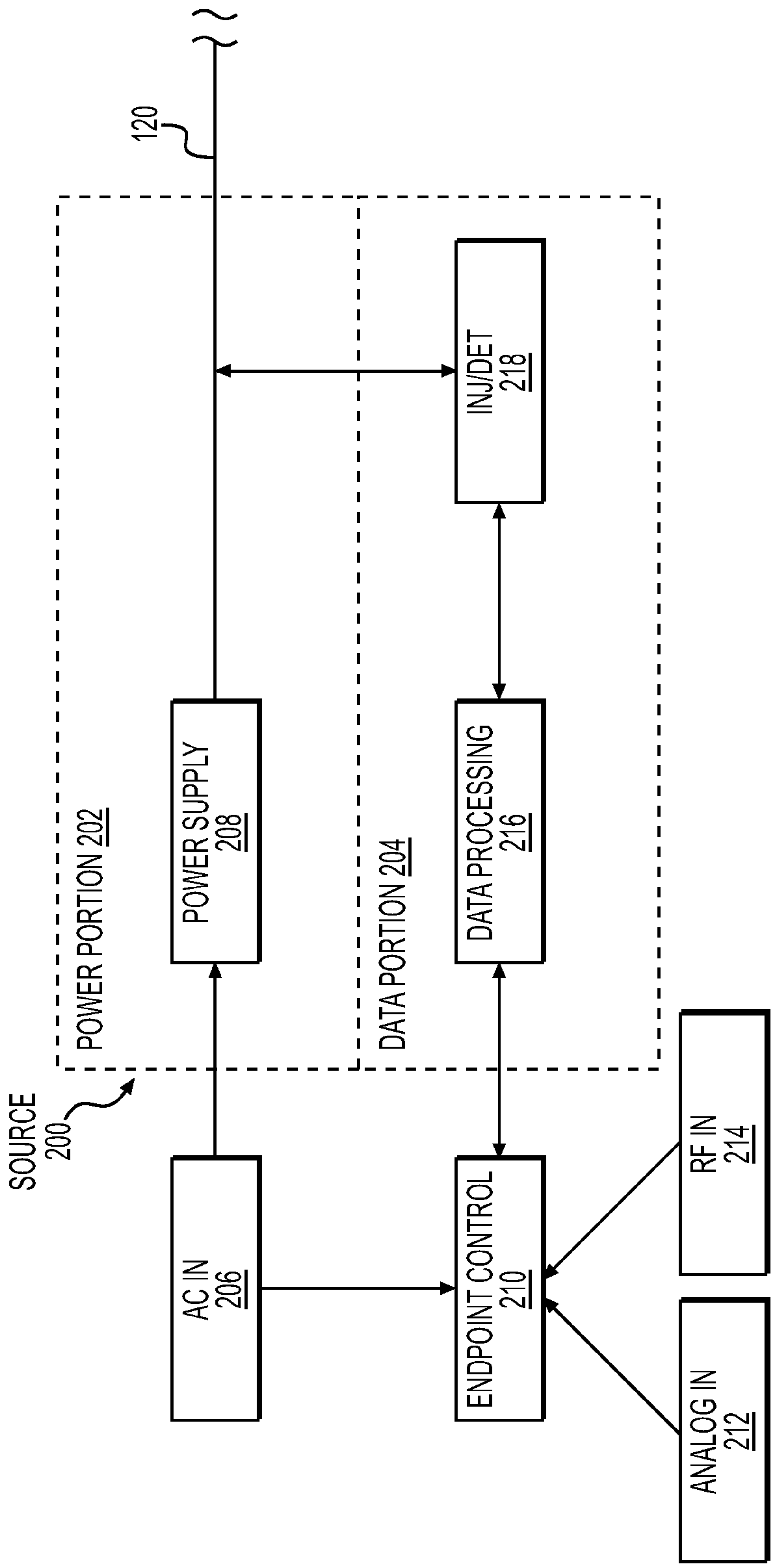
FIG. 2A is a functional block diagram of a power source with integrated data transmission within the system of FIG. 1 consistent with an example of the disclosure.

FIG. 2A is a functional block diagram of a power source 200 with related circuitry according to certain examples for the present disclosure. Power source 200 provides power to a remote load integrated with data and may generally entail a power portion 202 and a data portion 204. Power source 200 may output the electrical power together with data to a conductor 120, preferably as a cable of a conventional two-wire conductor.

In the example of FIG. 2A, power portion 202 provides a relatively constant output of DC voltage, such as 12 VDC, to conductor 120. Power supply 208 receives an AC input from mains power 206, such as 120 VAC, and converts the AC power to a DC voltage for delivery to conductor 120. While FIG. 2A depicts a conversion from AC mains power to constant DC power, other variations for providing electrical power to a remote load do not detract from the principles of the present disclosure. For instance, power source 200 may derive its initial electrical power other than from AC mains power. DC power could be provided as an origin to power source 200, wherein AC-DC converter 208 may function, for example, to step down the voltage of the received DC power rather than to convert AC to DC. AC-DC converter as part of power supply 208 may include various filters for its voltage output consistent with the techniques described further below.

Data portion 204 of power source 200 may include an endpoint control module 210. Having electrical components in known configurations, endpoint control module 210 may consolidate input from one or more sources in the form of control data for a remote endpoint 250. As examples in FIG. 2A, for an endpoint 250 that includes an LED for area illumination, an analog dimming module 212 may provide control data relevant to adjusting a dimming level for the LED. The input from analog dimming module 212 could be provided in various ways, including by a simple resistive element to provide an analog voltage to endpoint control module 210. Other mechanisms and techniques for generating and conveying control data to and from endpoint control 210 will be readily apparent to those of ordinary skill in the art.

An RF control input 214 may serve as an additional or alternative source for providing control data to endpoint control module 210. In this manner, a user may remotely provide input to system 100 for setting parameters for a load 250 positioned remotely, such as in a hard-to-service location. RF control input 214 could include components and functionality well known to those skilled in the art. RF control input 214 may receive by RF or other technologies the desired parameters for a remote load 250. RF control input 214 may convert or otherwise alter its input to provide information as control data to endpoint control module 210.

As illustrated in FIG. 2A, the AC power input 206 itself may provide information relative to the setting of parameters and determining control data for a remote load 250. For instance, in implementations where load 250 includes one or more LEDs, the AC power input 206 may include phase-cut dimming to communicate a dimming level desired for the LEDs. Rather than communicate the phase-cut dimming to the LEDs across conductor 120, which may prove ineffective depending on the distance of conductor 120, system 100 includes endpoint control module 210 within power source 200. Endpoint control 210 may have electrical components in known configurations sufficient to detect the values for phase-cut dimming received in the AC voltage from AC power input 206.

Data portion 204 of power source 200 may include a data processing module 216 to receive the control data from endpoint control module 210. As described in additional detail below, data processing module 216 includes electrical components sufficient to convert the received control data into an information signal in the form of a serial transmission of data at predetermined data rate. For instance, the information signal may be a series of digital bits at a sequence of 2400 bits per second.

Further, data processing module 216 may include modulation circuitry to modulate the information signal onto a carrier signal of a select frequency to form a modulated signal. The form of modulation may be of any desired type, such as amplitude modulation, pulse-width modulation, or pulse-density modulation. The signal that is coupled onto the power delivery conductors may communicate information via encoding of data, or via timing information, such as a modulated PWM signal. In one example described more fully herein, the modulation is amplitude modulation, and carrier frequency greater than the data rate of the information signal by at least a multiple to ensure minimum attenuation of the modulated signal. In some examples, the carrier frequency exceeds the data rate by at least 10 times. The resultant modulated signal may use an encoding scheme, such as Manchester encoding, to ensure that the average DC signal level is near 0.

Data processing module 216 passes the modulated signal containing the control data to an injection/detection module 218. Injection/detection module 218 includes electrical components sufficient to allow the modulated signal to travel along conductor 120 to endpoint 250. Injection/detection module 218 enables the higher frequency of the modulation signal join the DC voltage output from AC-DC converter 208 without allowing the DC voltage to interfere with signals from microcontroller 216.

As a result, and as generally depicted in FIG. 2A, conductor 120 receives a combination of DC power and a modulated signal containing control data for transmission from power source 200 to endpoint 250.

Figure 2B:
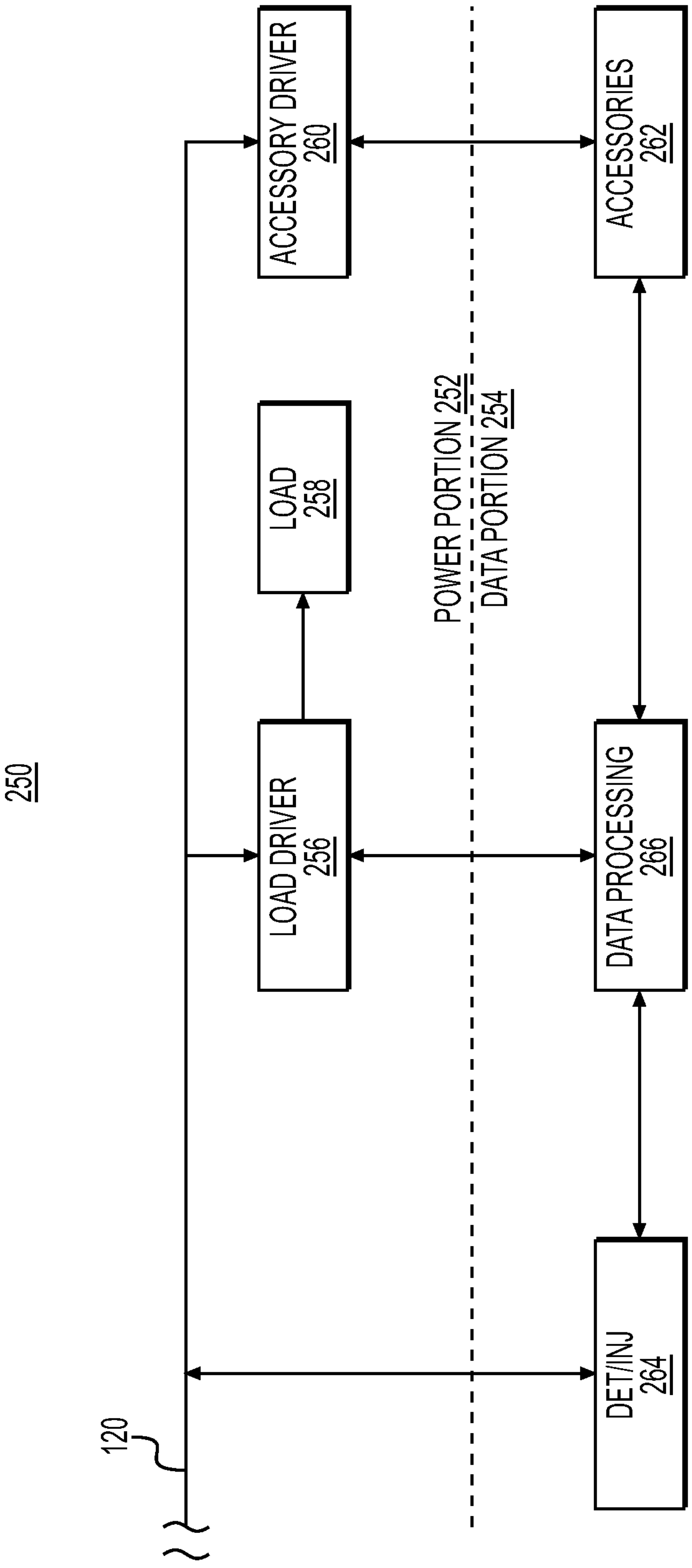
FIG. 2B is a functional block diagram of an endpoint within the system of FIG. 1 consistent with an example of the disclosure.

FIG. 2B is a functional block diagram of endpoint 250 with related circuitry according to certain examples for the present disclosure. As with power source 200, endpoint 250 may generally entail a power portion 252 and a data portion 254. Endpoint 250 may receive electrical power together with control data from conductor 120.

Endpoint 250 receives, in the example of FIG. 2B, a relatively constant output of DC power from power source 200 via conductor 120, and applies that DC power to drive a load 258, specifically one or more LEDs. Endpoint 250 includes load driver 256, which may have circuitry capable of providing, for example, a constant DC current for driving a bank of LEDs 258. In one example, load driver 256 may include a DC-DC constant current driver known to those skilled in the art for powering LEDs 258.

In some embodiments, power portion 252 of endpoint 250 may include an accessory driver 260 for providing a source of electrical power for external accessories 262. External accessories 262 may include devices such as sensors that detect performance or surrounding conditions for LEDs 258.

For example, sensors 262 may detect the color balance or luminance provided by LEDs 258, among many other parameters. Accessory driver 260 may include circuitry capable of providing, for example, a constant DC voltage output required for operating the accessories 262 in a known fashion.

Data portion 254 of endpoint 250 may include a detection/injection module 264. Detection/injection module 264 may have electrical components sufficient to allow the modulated signal received on conductor 120 with a higher frequency to pass while essentially blocking the relatively constant DC voltage.

In addition, data portion 254 includes a data processing module 266 coupled to detection/injection module 264. In some examples, data processing module 266 receives the modulated signal from detection/injection module 264 and includes electrical components sufficient to extract the information signal from the modulated signal. For instance, data processing module 266 may contain circuitry that demodulates the modulated signal to recover the information signal. Moreover, data processing module 266 may obtain the control data from the information signal and may generate signaling to apply the control data to LED load 258. For example, if the control data relates to a dimming level to be applied, data processing module 266 conveys that control data to change the dimming of LED load 258. Similar responses will be apparent for other parameters for LED load 258, as for different types of load 258.

While system 100 has been described with respect to one-directional communication from power source 200 to endpoint 250, in some embodiments system 100 may include the capability for communication from endpoint 250 to power source 200 as well. Specifically, sensors or other accessories 262 may capture feedback data to be shared with power source 200. For instance, a color balance or luminance value for a bank of LEDs 258 may be detected by one or more sensors 262 and provided as feedback data to data processing module 266. Data processing module 266 may, in some examples, include circuitry for generating a second information signal based on the feedback data and modulating a second carrier frequency with the second information signal to create a second modulated signal. Detection/injection module 264 may include electrical filters to pass the second modulated signal onto conductor 120 for passage to power source 200.

In this bidirectional option, referring to FIG. 2A, injection/detection module 218 within power source 200 may additionally include electrical filters selected to allow passage of the second modulated signal to data processing module 216. Data processing module 216 within power source 200 may include circuitry that demodulates the second modulated signal received from endpoint 250 and extracts the second information signal and/or the feedback data. Data processing module 216 may, in some examples, provide the feedback data for user consideration or apply the data to determine through various algorithms additional control data to be sent to endpoint 250.

In some examples, data processing unit 216 in power source 200 and/or data processing unit 266 in endpoint 250 may include algorithms to control and manage the delivery of data signals between the remote units. These algorithms may aim to avoid or compensate for potential collisions in the delivery of data such as by handling contentions on conductor 120 similar to a data bus. These contentions may arise, for example, when two power source 200 and endpoint 250 attempt to communicate at the same time over conductor 120. Alternatively, or additionally, when a power unit 110 or a remote load 130 contains more than one power source or endpoint, respectively, as illustrated in FIG. 1, multiple ones of these units may communicate simultaneously. The algorithms will ensure the integrity of data transmission. Basic examples of such algorithms may include delays in transmissions, timing intervals, and other techniques within the knowledge of those of ordinary skill in the art. Moreover, the system may include address information in the signal such that communication sources can communicate with one communication load at a time or communicate with all communication loads at once.

Figure 3:
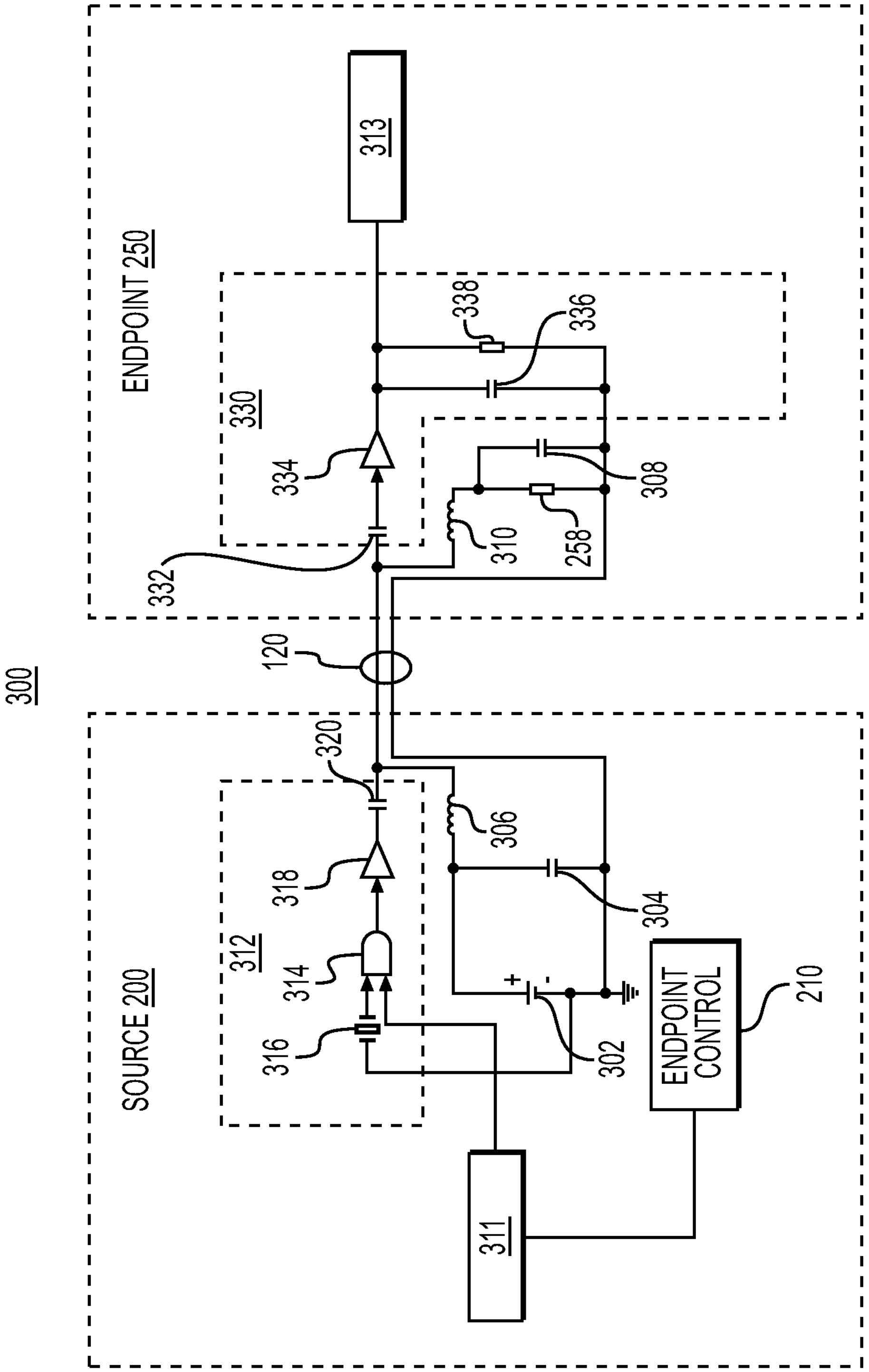
FIG. 3 is an exemplary schematic diagram for one-way communications in a system for remote power delivery consistent with an example of the disclosure.

FIG. 3 is a generalized schematic diagram for one-way communications in an example for a system 300 for remote power delivery consistent with high-level system 100. As generally depicted in FIG. 3, source 200 may include a voltage supply 302 of AC or DC constant voltage. In one example, voltage supply 302 is a power source providing DC power. Coupled to voltage supply 302 is a low-pass filter that permits the passage of the DC power, while preventing interference from higher frequency signals on cable 120. In one example of FIG. 3, the low-pass filter is formed by a capacitor 304 in parallel with voltage supply 302 and an inductor 306 in series between voltage supply 302 and an output of source 200 where conductor 120 is coupled. The values for capacitor 304 and inductor 306 may depend on the frequencies selected for operating system 300, as discussed further below.

Similarly for endpoint 250, a low-pass filter permits the passage of the DC power to load 258, while filtering out higher frequencies. In particular, as shown in FIG. 3, low-pass filter may be formed by a capacitor 308 in parallel with load 258 and an inductor 310 in series between conductor 120 and load 258. The values for capacitor 308 and inductor 310 may depend on the particular frequencies selected for operating system 300, as discussed further below.

Data processing module 216 in FIG. 2A and data processing module 266 in FIG. 2B may be implemented, in part, by microcontroller 311 and microcontroller 313, respectively. While the preferred implementations of this disclosure involve few and simple devices to provide low-cost solutions, the functionality of either microcontroller 311 or 313 may also be embodied in various forms, including one or more processors and one or more computer readable media that stores various modules, applications, programs, or other data. The computer-readable media may include instructions that, when executed by the microcontroller or one or more processors, cause the processors to perform the operations described herein. In some implementations, microcontroller may include a central processing unit, microprocessor, a digital signal processor or other processing units or components known in the art. Alternatively, or in addition, the functionally described herein can be performed, at least in part, by one or more hardware logic components. Additionally, microcontroller 311 or 313 may possess its own local memory, which also may store program modules, program data, and/or one or more operating systems.

Microcontroller 311 may be configured to receive control data from endpoint control module 210. As discussed above, the control data from module 210 contains values, settings, changes, instructions, or other information intended to affect the operation of an endpoint 250 located remotely. Microcontroller 311 may be coded to function in a manner that receives the control data and outputs an information signal at a suitable data rate, such as 2400 bits per second, that includes the control data.

Data processing module 216 may also include, in the example of FIG. 3, a modulator 312. Modulator 312 receives the information signal from microcontroller 311 and generates the modulated signal to send to endpoint 250. As shown in FIG. 3, modulator 312 in a simple and low-cost implementation may include a digital AND gate 314 that receives at one input the information signal from microcontroller 311 and at a second input a carrier frequency generated by an oscillator 316. In addition, modulator 312 may have a driver 318 and a capacitor 320 coupled in series to an output of source 200. Capacitor 320 can provide the function of a high-pass filter, enabling the modulated signal to pass onto conductor 120, and suitable values for capacitor 320 are within the knowledge of those skilled in the art. Other implementations are possible for modulator 312, with the implementation in FIG. 3 providing a low-cost alternative with few components.

Data processing module 266 in FIG. 2B may be partially implemented with a demodulator 330, which functions to demodulate the received modulated signal. In a simple embodiment shown in FIG. 3, demodulator 330 may entail capacitor 332, receiver 334, capacitor 336, and resistive element 338. Capacitor 332 is configured in series with receiver 334 and conductor 120 and provides a high-pass filtering function similar to capacitor 320. Capacitor 336 and resistive element 338 are tuned components with values selected to help demodulate the information signal from the carrier signal on the received demodulated signal.

Data processing module 266 in FIG. 2B, as mentioned, may also be partially implemented with microcontroller 313. Microcontroller 313, as with microcontroller 311, is controlled to perform operations according to stored instructions. Microcontroller 313 may receive the information signal from demodulator 330 after demodulation has occurred. As noted previously, microcontroller 313 may process the information signal to determine the control data sent from source 200 and may perform operations to change settings or performance of load 258, which may be one or more LEDs or other electronic components.

As illustrated in FIG. 3, supply 200 may include an inductor 306 coupled with a capacitor 304, and the load 258 may include an inductor 310 coupled with a capacitor 308. Inductor 306 coupled with capacitor 304 and inductor 310 coupled with capacitor 308 form filter networks. These filter networks allow inductor 306 and inductor 310 to decouple the high-frequency signals associated with the modulated signal injected on the cable from modulator 312 via capacitor 320 and received on cable 120 via capacitor 332 by demodulator 330.

Ignoring parasitics, the minimum cutoff frequency of the decoupling will be approximately defined as:

$$\text{Decoupling}_{3db} = \text{Maximum}\left(\frac{1}{1*\pi*\sqrt{Lsupply*Csupply}}, \frac{1}{1*\pi*\sqrt{Lload*Cload}}\right)$$

where Lsupply is inductor 306, Csupply is capacitor 304, Lload is inductor 310, and Cload is capacitor 308. Therefore, one of ordinary skill in the art may select capacitor and inductor values for the arrangement as exemplified in FIG. 3 to balance a frequency to be injected onto cable 120 by modulator 312. To ensure minimum attenuation of the modulated signal, the modulation or carrier frequency generated by the oscillator, such as oscillator 316, should be greater than about 10 times the decoupling frequency.

In certain implementations consistent with this disclosure, the system 300 may operate with a carrier frequency that is greater than the data rate of the information signal. Nominally, the carrier frequency may be at least a multiple of the data rate, and in some examples, at least 10 times the data rate. Therefore, if the data rate for the information signal from microprocessor 311 is 2400 bits per second, the carrier frequency from oscillator 316 for modulation would preferably be at least, but not limited to, 24,000 Hz. This difference may advantageously reduce any ripple at the output of the demodulator 330 and help enable low-cost and accurate detection of the transmitted data. As well, in other examples, the carrier frequency for modulation rate could be greater than 20 KHz to avoid any potential for acoustic noise but be less than 525 KHz to 1.705 MHz to avoid interference with the AM radio band.

Consequently, data communication on system 300 in some embodiments may be configured to operate at much lower frequencies than typical communication standards, such as between 20 KHz-525 KHz. These lower frequencies may significantly reduce system cost and electromagnetic interference. In addition, units operating according to these examples may require less power to remain in an off state. Minimum dissipated power is a function of the capacitors used for coupling to the power, the signaling voltage level, and the modulation frequency. Lowering the modulation frequency has an approximately linear relationship to minimum dissipated power. The minimum modulation frequency is influenced by the value of the decoupling inductors and the size of the power supply and load capacitance.

Figure 4:
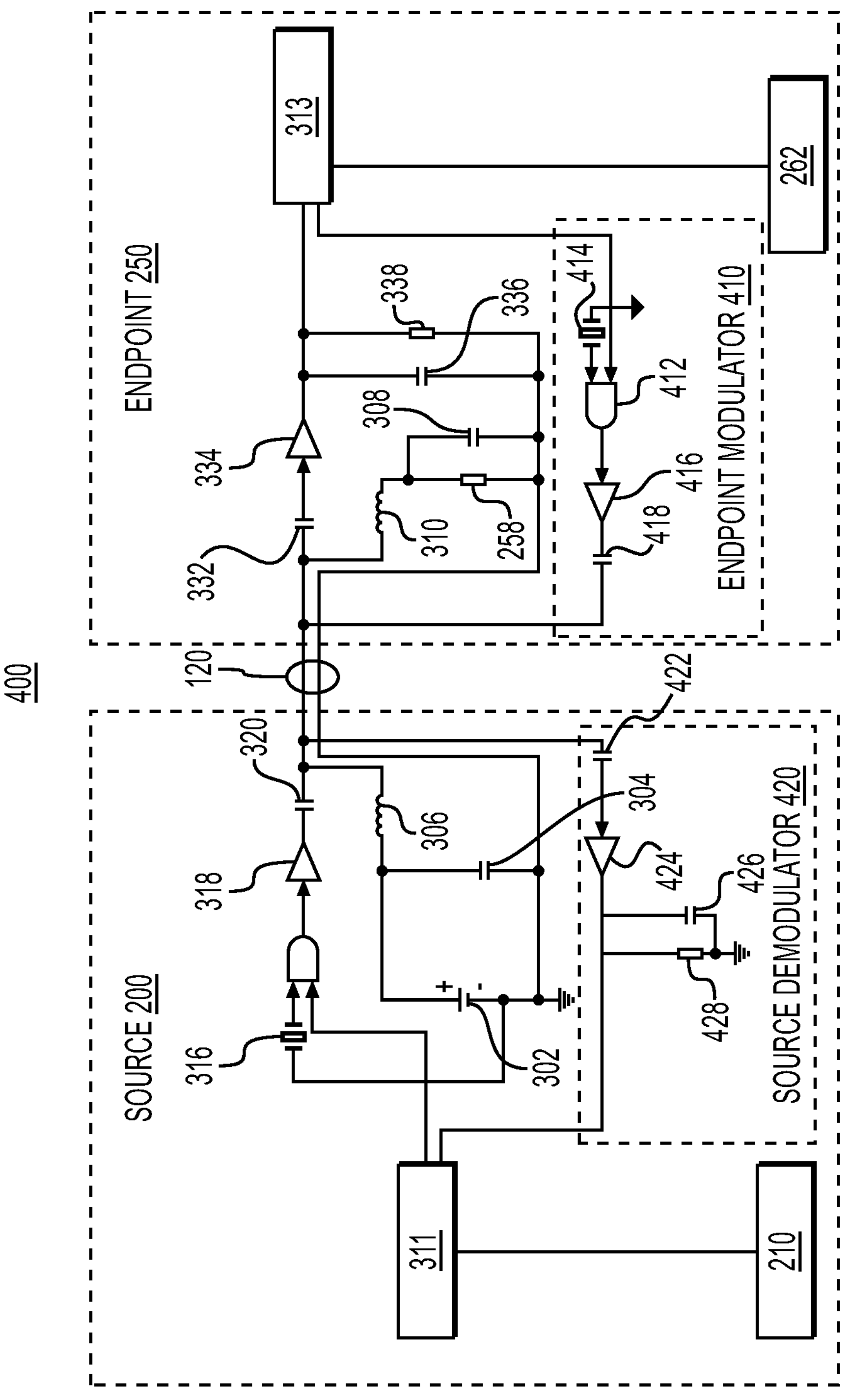
FIG. 4 is an exemplary schematic diagram for two-way communications in a system for remote power delivery consistent with an example of the disclosure.

FIG. 4 is a generalized schematic diagram for two-way communications in an example system 400 for remote power delivery. System 400 depicts having the same circuitry for one-way communication from source 200 to endpoint 250 as shown in FIG. 3. In addition, to accommodate bidirectional communications, system 400 may include an endpoint modulator 410 coupled between microcontroller 313 and cable 120 and a source demodulator 420 coupled between cable 120 and microcontroller 311.

In the example of FIG. 4, endpoint modulator 410 may have circuitry similar to modulator 312 in FIG. 3. Specifically, endpoint modulator 410 may include a digital AND gate 412 with one input connected to an output of microcontroller 313 and a second input connected to an oscillator 414. The output of the microcontroller 313 may provide a second information signal at a data rate, such as 2400 bits per second. The second information signal may contain in substance feedback data to be passed to source 200. Without limitation, the feedback data may relate to detections by sensors or other accessories 262, operational status levels for load 258 such as white point settings for one or more LEDs, and the like. Oscillator 414 provides a second carrier frequency for modulating the second information signal. In some examples, the second carrier frequency is the same as the first carrier frequency. The second carrier frequency may also be different from the first carrier frequency, as desired. The AND gate 412 produces a second modulated signal from the second carrier frequency and the second information signal.

A second portion of endpoint modulator 410 may include a driver 416 and a capacitor 418. This second portion may function as a high-pass filter and include a value for capacitor 418 to permit passage of the frequencies for the second modulated signal while blocking lower frequency signals.

Selection of the appropriate capacitance for a given design will be within the knowledge of one of ordinary skill in the art.

Source demodulator 420 in FIG. 4 may have circuitry similar to demodulator 330 in FIG. 3. Specifically, source demodulator 420 may in some examples have a high-pass filter at its input resembling the output of endpoint modulator 410, i.e. with capacitor 422 in series with driver 424. This arrangement may have values selected to permit the passage of the second modulated signal received from cable 120. Following driver 424, a tuned capacitor 426 and resistive element 428 in parallel are selected with values to filter the second carrier frequency from the second information signal on the received second modulated signal in a manner resembling demodulator 330 in endpoint 250. As a result, source demodulator 410 may provide to an input of microcontroller 311 the second information signal. In turn, microcontroller 311 using programmed instructions may process the second information signal to determine the feedback data. Microcontroller 311 may act on the feedback data, for example, through programmed instructions by sending new control data to endpoint 250 to alter behavior of remote load 258 or by providing the feedback data to a user, perhaps via a graphical user interface.

Accordingly, system 400 enables bidirectional communication of data between source 200 and endpoint 250 simply and at low cost. A minimal number of inexpensive components are provided for both source 200 and endpoint 250, which can lead to units and an overall system that are affordable and avoid technical complexity. While other components may be added or chosen in various implementations that could increase cost or complexity, the embodiments of FIGS. 3 and 4 represent a simple approach that alone may achieve a desired objective for delivering power with integrated data transmission for a remote load such as one or more LEDs.

Figure 5:
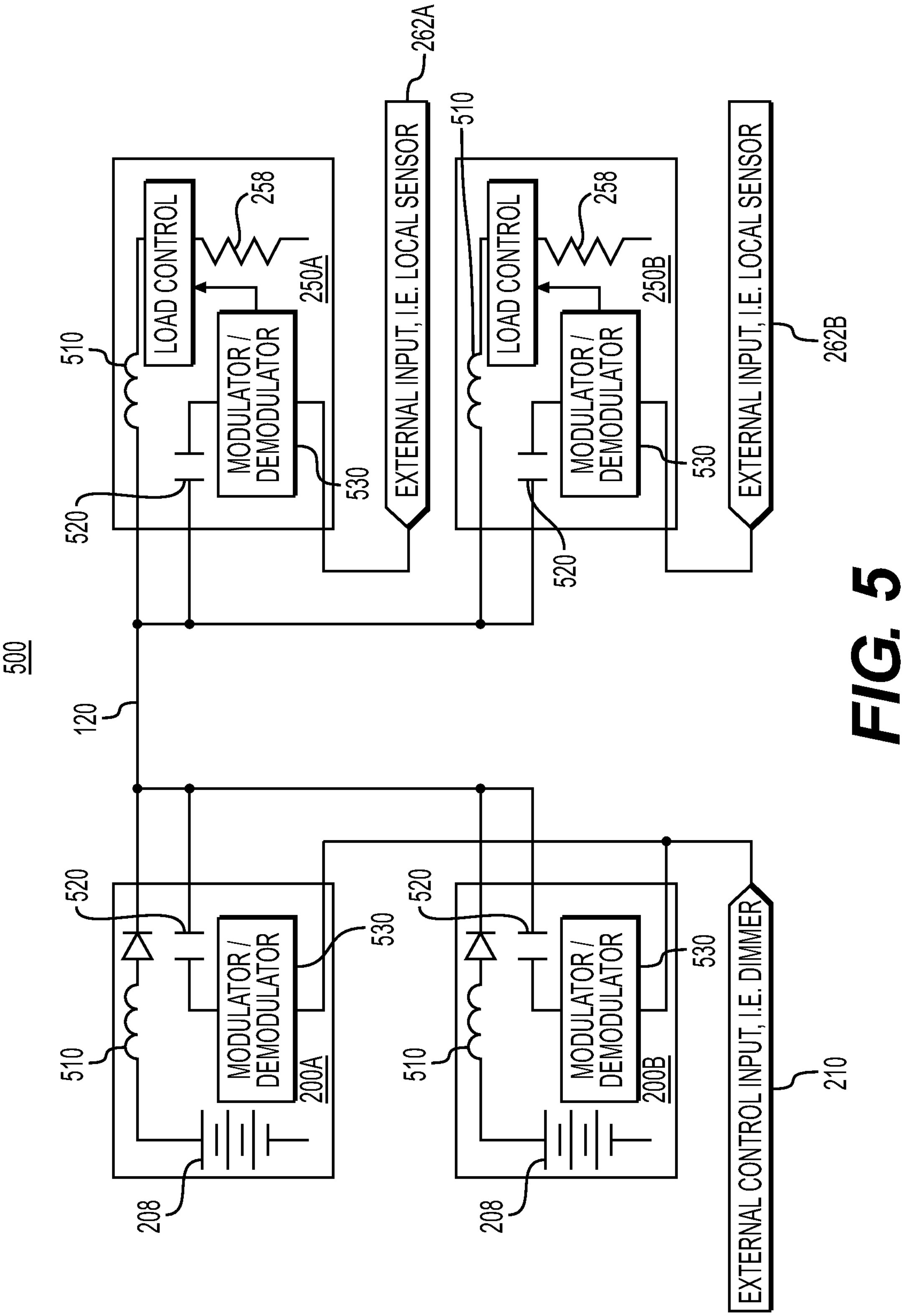
FIG. 5 is a system level block diagram of remote power delivery with integrated data transmission having redundant sources and loads consistent with an example of the disclosure.

FIG. 5 is a block diagram indicating a possible arrangement with multiple power sources 200 and multiple endpoints 250. In some examples, each source 200A and 200B may provide electrical power to conductor 120 from a supply 208 through low-pass filters 510. The outputs of sources 200A and 200B may be ganged together in parallel for redundancy. Each endpoint 250A and 250B in turn may receive the delivered power from conductor 120 through low-pass filters 510 for driving loads 258. The inputs of endpoints 250A and 250B may be ganged together in parallel.

In certain implementations such as shown in FIG. 5, each source 200A and 200B may receive external input from endpoint control 210. The external input for the power unit may include signaling from a variety of origins, as discussed above for FIG. 2A, to indicate desired performance or settings for a load 258 at one or both of endpoints 250A and 250B.

Likewise, each endpoint 250A and 250B may receive external input from a local sensor or accessory 262A or 262B. The external input for the remote load may include signaling from a variety of origins, as discussed above for FIG. 2B, to feed data back to the power unit relating to settings or operation for a load 258 at one or both of endpoints 250A and 250B.

In some examples, circuitry 510 may provide functionality as a modulator and/or a demodulator within one or more of the sources 200A and 200B. As discussed above for other implementations, circuitry 510 can collectively send and receive modulated data communications between power sources 200 and endpoints 250 in a bidirectional manner. Load control 260 within endpoint 250A and 250B may implement the control data sent by a source 200A or 200B with respect to a load 258.

Figure 6:
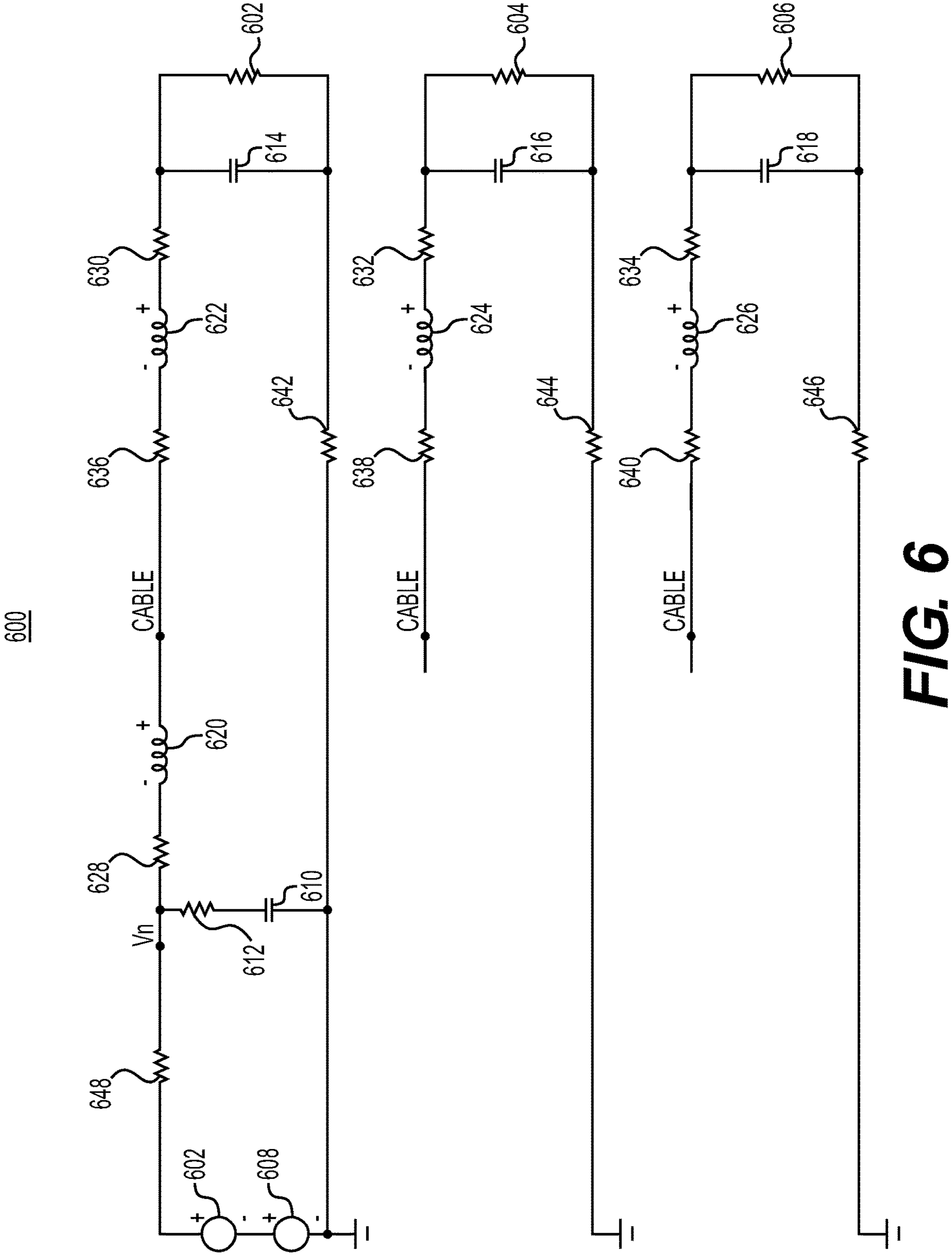
FIG. 6 is a schematic diagram of a circuit used for simulating data communication integrated with power delivery consistent with an example of the disclosure.

FIG. 6 is a schematic diagram of a circuit 600 for simulating data communication integrated with power delivery for an arrangement similar to FIG. 3. As an example, circuit 600 contains a central power unit 602 and three remote loads 604, 606, and 608. A noise source 608 was added in series with power unit 602 to simulate noise that would naturally be present from a typical switching power supply. Power unit 602 was fixed at a constant 56V. Noise source 608 was set as a 1V pk-pk square wave signal at 100 KHz. The loads 604, 606, and 608 were implemented as resistors designed to provide a load of approximately 10 W. In one example, the resistances were 313.6 Ohms.

Circuit 600 includes capacitor 610 and resistor 612 as typical simulated capacitance for power supply 602 at the operating conditions. In one example, capacitor 610 is 1200 uF. Resistor 612 improves the simulation of capacitor 610 and are set at 0.2 Ohms. Similarly, capacitors 614, 616, and 618 represent typical bulk capacitance affiliated with the loads and are selected at 100 uF.

Inductors 620, 622, 624, and 626 represent the decoupling inductance that would be incorporated into the central power unit 602 and the remote loads 602, 604, and 606. They have values of 100 u. Resistors 628, 630, 632, and 634 represent the typical parasitic resistances of these inductors, respectively, and are set at 0.1 Ohms.

In certain examples, parasitic resistance may also be added to the cable to simulate poor connections and losses likely in the signal and ground conductors. Resistors 636, 638, and 640 may represent a potentially lossy 1 Ohm cable resistance for the positive wire, while resistors 642, 644, and 648 may represent 1 Ohm lossy connections to ground. Finally, resistor 648 represents a 0.1 Ohm source impedance from source 602 to maximize noise.

Figure 7:
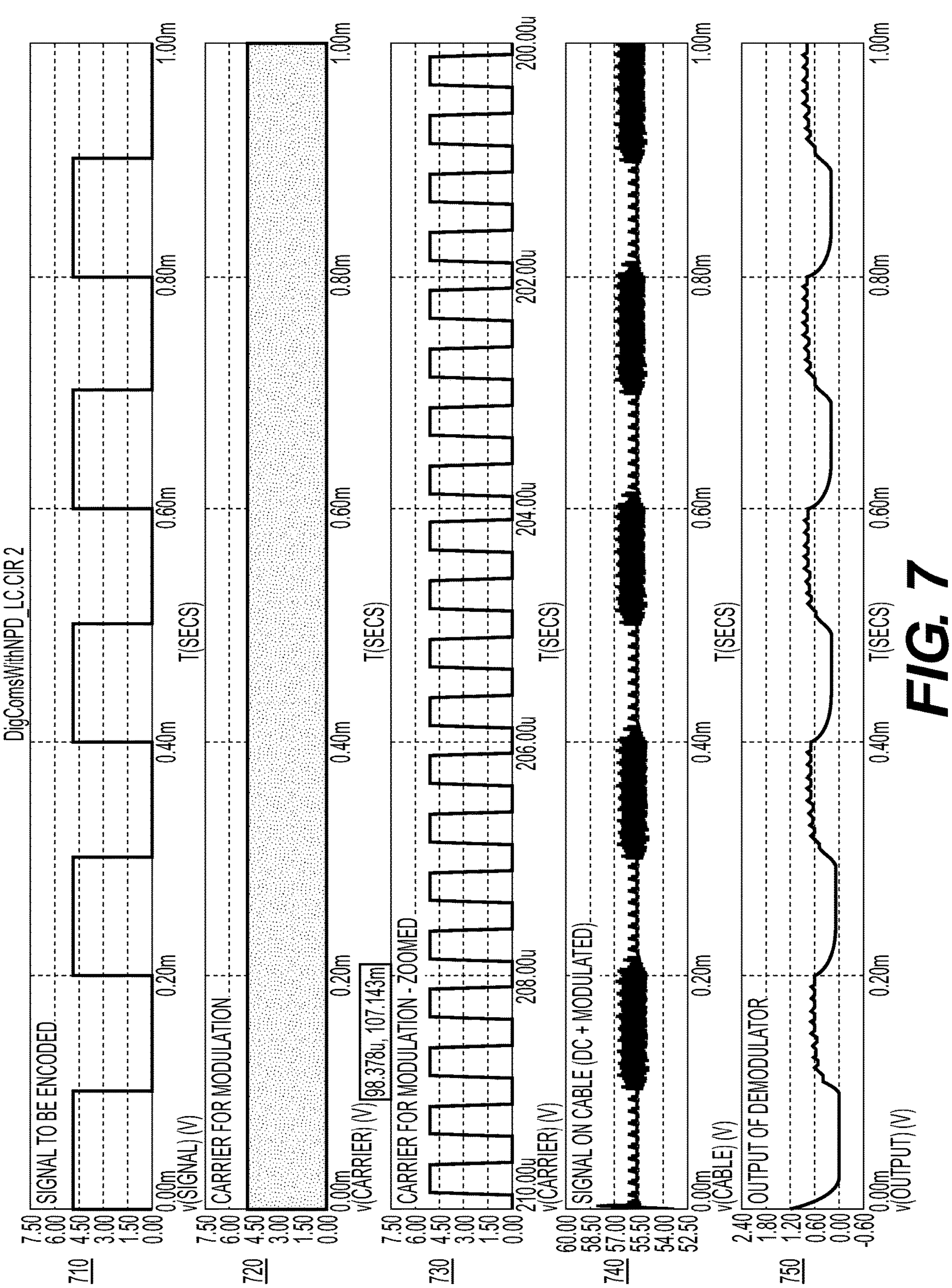
FIG. 7 are timing diagrams of a simulation on the circuit of FIG. 6 consistent with an example of the disclosure.

FIG. 7 illustrates results of a simulated transmission of a modulated signal across simulation circuit 600 of FIG. 6 in the form of timing diagrams. Top waveform 710 depicts is the signal to be encoded, which may represent the information signal discussed above exiting microcontroller 311 within power source 200 in FIG. 3. Waveform 720 illustrates a carrier frequency to be used for modulation, such as the frequency generated by oscillator 316. Note that the relative high frequency of the waveform 720 makes it appear to be a solid form. Waveform 730 illustrates this carrier frequency when zoomed in at a smaller scale to show its oscillation. The fourth waveform 740 is an exemplary modulated signal that could appear on cable 120 that connects the power unit 200 and the endpoint unit 250. Finally, the last waveform 750 depicts the simulated signal that would be generated after demodulation, such as at the input to microcontroller 313 within endpoint 250 in FIG. 3. Note that a logical zero (low level) for the signal to be encoded in waveform 710 represents a logical active level. Hence, the modulated signal on the cable in waveform 740 is visible and the output of the demodulator in waveform 750 is a logical high when the signal to be encoded is near a zero voltage level (logical low).

Sequences for exchanging control data, feedback data, and instructions between power sources 200 and endpoints 250 may vary widely and are within the knowledge of those skilled in the art. Without limitation, some examples include, upon system power-up, or at a time as initiated by one of the connected units, the endpoints 250 first communicating their operational requirements to the power sources 200. Power sources 200, based on the operational requirements of the loads, will modify the operating parameters of the power sources 200 to optimize system performance (i.e., the sources may reduce their output voltage to optimize the efficiency of the connected loads or they may enter a power-saving state).

In some examples, upon system power up, power source 200 will query all connected endpoints 250 to determine maximum power draw. If the maximum power draw exceeds the capability of the power source 200, source 200 will not enable power output onto the loads and may trigger a warning signal, visual, sonic, or via a communications interface. Alternately, for LED loads, power source 200 may calculate a maximum light output (dimming level) that prevents it from being overloaded and will ensure this value is not violated.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:

a source for delivering DC power integrated with control data for operating a light emitting diode (LED) within an endpoint, comprising:

a power supply with a source low-pass filter coupled to a supply output and configured to provide the DC power to the supply output;

a source microcontroller configured to receive an external input relating to the control data and to output at a data frequency a first information signal comprising the control data; and a source modulator coupled to the source microcontroller and configured to generate a first modulation signal, the first modulation signal comprising a first carrier frequency modulated with the first information signal, wherein the first carrier frequency is greater than the data frequency, the source modulator being configured to pass the first modulation signal through a source high-pass filter to the supply output;

a cable configured to communicate the DC power and the first modulation signal from the source and to the endpoint; and the endpoint positioned remotely from the source for receiving the DC power and the first modulation signal from the cable, comprising:

an endpoint input coupled to the conductor to receive the DC power;

the LED with an endpoint low-pass filter coupled to the endpoint input, the low-pass filter configured to separate the DC power from the first modulation signal to provide the DC power to the LED;

an endpoint demodulator with an endpoint high-pass filter coupled to the endpoint input and configured to demodulate the first modulation signal received within the DC power; and an endpoint microcontroller configured to receive the control data from the endpoint demodulator and to output signals for controlling operation of the LED based at least in part on the control data.

2. The system of claim 1, wherein the endpoint further comprises:

a sensor, local to the LED, configured to detect performance by the LED and to communicate a status of the performance to the endpoint;

an endpoint modulator coupled to the endpoint microcontroller and configured to generate a second modulation signal, the second modulation signal comprising a second carrier frequency modulated with a second information signal comprising the feedback data, wherein the second carrier frequency is equal to the first carrier frequency, the endpoint modulator being configured to output the second modulation signal to the endpoint input.

3. The system of claim 2, wherein the source further comprises:

a source demodulator coupled between the supply output and the source microcontroller, the source demodulator being configured to receive the second modulation signal at the supply output and to demodulate the second information signal from the second carrier frequency, the source demodulator further being configured to provide the second information signal to the source microcontroller.

4. The system of claim 2, wherein the performance by the LED comprises one or more of color balance, luminance, and white point setting.

5. The system of claim 1, further comprising one or more additional sources connected in parallel to the source, the one or more additional sources comprising an additional power supply and an additional source modulator.

6. The system of claim 1, further comprising one or more additional endpoints connected in parallel to the endpoint, the one or more additional endpoints comprising an additional LED and an additional endpoint demodulator.

7. The system of claim 1, wherein the source further comprises:

an AC voltage source configured to provide an AC input voltage, the AC input voltage being phase-cut to indicate a dimming level for the LED; and an endpoint control module coupled between the AC voltage source and the source microcontroller, the endpoint control module configured to detect the dimming level from the phase-cut of the AC input voltage and to provide the dimming level as the external input to the source microcontroller.

8. The system of claim 1, wherein the source further comprises:

an analog voltage source configured to provide a voltage indicating a dimming level for the LED; and an endpoint control module coupled between the analog voltage source and the source microcontroller, the endpoint control module configured to detect the dimming level from the voltage and to provide the dimming level as the external input to the source microcontroller.

9. A method for delivering DC power integrated with control data to an endpoint at a remote location, comprising:

providing DC power, for a light emitting diode (LED) at the endpoint, from a supply output of a power supply, the power supply having a source low-pass filter coupled to the supply output;

receiving, by a microcontroller, an external input relating to the control data, the control data comprising an operational setting for the LED;

outputting, by the microcontroller, a first information signal at a data frequency, the first information signal comprising the control data with the operational setting for the LED;

generating, by a modulator, a first modulation signal comprising a first carrier modulated with the first information signal, wherein the first carrier frequency exceeds the data frequency;

passing, by the modulator, the first modulation signal through a high-pass filter to the supply output; and transmitting the first modulation signal and the DC power through a cable to the endpoint.

10. The method of claim 9, further comprising:

receiving a second modulation signal at the supply output from the endpoint;

demodulating the second modulation signal into a second information signal, the second information signal comprising feedback data, wherein the feedback data comprises a performance condition of the LED; and generating second control data for the LED, the second control data providing an additional operational setting for the LED in response to the performance condition of the LED.

11. The method of claim 9, further comprising:

receiving a dimming voltage indicating a dimming level for the LED from a dimming input;

detecting the dimming level from the dimming voltage at the dimming input;

providing the dimming level to the microcontroller as the external input; and selecting the dimming level as the operational setting in the control data.

12. The method of claim 9, wherein the first modulation signal communicates the control data encoded through frequency modulation to the endpoint.

13. The method of claim 9, wherein the first modulation signal communicates the control data through timing information to the endpoint.

14. A method for interfacing between a load having one or more endpoints proximate to one or more light emitting diodes (LEDs) and a power unit having one or more power sources remote from the load, comprising:

receiving, at the load, DC power at an endpoint input from a cable coupled to the power unit;

passing the DC power through an endpoint low-pass filter and to an LED of the one or more LEDs;

receiving, within the load, feedback data relating to an operational condition of the LED;

generating, within the load, a first modulation signal comprising a first carrier modulated with a first information signal, the first informational signal comprising the feedback data; and outputting, from the load, the first modulation signal at the endpoint input and through the cable to the power unit.

15. The method of claim 14, wherein the receiving the feedback data relating to the operational condition of the LED comprises receiving a communication from a sensor local to the LED.

16. The method of claim 15, wherein the communication from the sensor comprises one or more of color balance, luminance, and white point setting for the LED.

17. The method of claim 14, wherein the receiving the feedback data relating to the operational condition of the LED comprises receiving an indication of power draw by the LED.

18. The method of claim 17, further comprising:

while receiving the DC power at the endpoint input, receiving a query at the endpoint input from the power unit relating to the power draw by the LED.

19. The method of claim 14, further comprising:

receiving, at the endpoint input, a second modulation signal within the DC power from the cable coupled to the source;

demodulating, by the endpoint, the second modulation signal; and identifying, at the load, control data for the LED from the second modulation signal, the control data comprising operational settings for the LED in response to the feedback data.

20. The method of claim 14, wherein the operational condition is a power draw for the LED, the method further comprising:

sending, from the load, additional feedback data relating to additional power draw for other LEDs of the one or more LEDs;

receiving, at the power unit, the additional feedback data; and modifying, at the power unit, the DC power generated by the one or more power sources in response to the power draw and the additional power draw indicated in the feedback data and the additional feedback data.

* * * * *